United States Patent [19]
Keen

[11] 3,759,228
[45] Sept. 18, 1973

[54] PET WATERING APPARATUS

[76] Inventor: Rodway W. Keen, 1609 Tanglewood, Odessa, Tex. 79760

[22] Filed: Dec. 20, 1971

[21] Appl. No.: 209,974

[52] U.S. Cl. .................................. 119/79, 119/78
[51] Int. Cl. .......................................... A01k 07/02
[58] Field of Search .................. 119/75, 78, 79, 80, 119/72.5

[56] References Cited
UNITED STATES PATENTS

| | | | |
|---|---|---|---|
| 3,150,639 | 9/1964 | Sereda | 119/78 |
| 3,292,588 | 12/1966 | Patrick | 119/78 X |
| 3,286,724 | 11/1966 | Sawyer | 119/78 X |
| 2,614,532 | 10/1952 | Steel | 119/78 |
| 2,338,072 | 12/1943 | Quinn | 119/78 |
| 1,274,894 | 8/1918 | Kirby | 119/78 |
| 1,811,375 | 6/1931 | Wysong | 119/80 UX |

Primary Examiner—Louis G. Mancene
Assistant Examiner—James H. Czerwonky
Attorney—Marcus L. Bates

[57] ABSTRACT

Watering apparatus for pets comprised of an enclosure means and a closure means, and which can be connected to a suitable source of water and placed at a convenient location in or about the home so as to provide a readily available supply of water for the pet. A float actuated valve assembly is disposed within the enclosure for maintaining a suitable liquid level therein. The pet gains access to the interior of the enclosure by means of a rolled port which is formed within a lid of the container. The location of the port relative to the float precludes inadvertent spillage of water from the container. The closure means has a circumferentially extending grooved section on the inner wall of its lower circumferential terminal edge portion to releasable engage the upper circumferential terminal edge portion of the enclosure means. The edge portions are spaced from the respective wall portions of the members by horizontal flat marginal areas.

4 Claims, 5 Drawing Figures

PATENTED SEP 18 1973
3,759,228
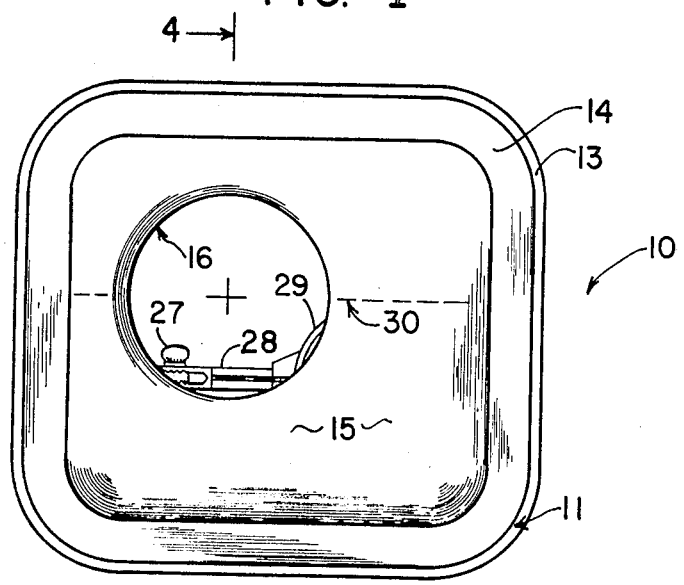
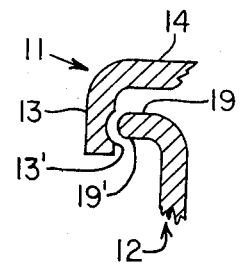
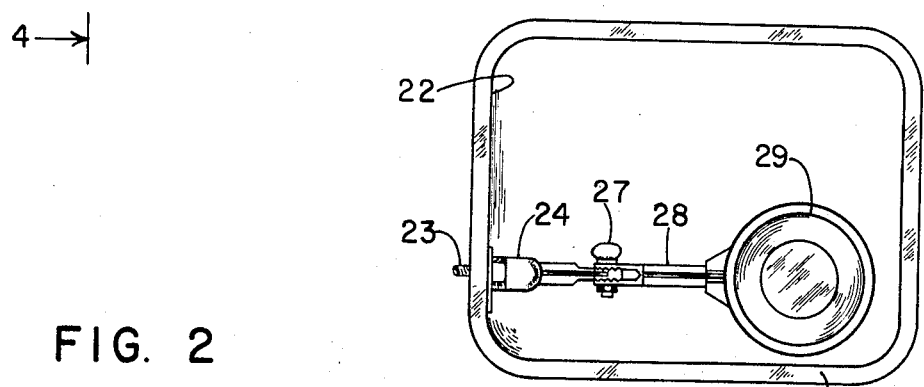
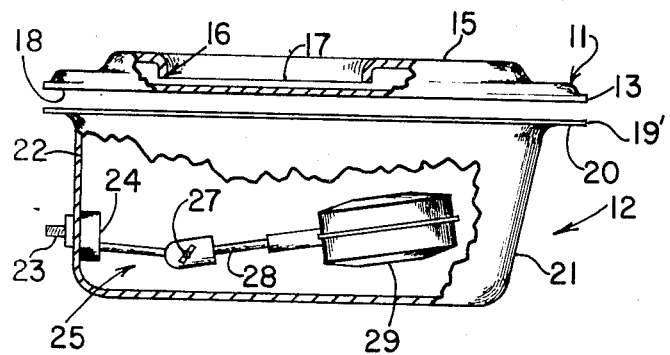
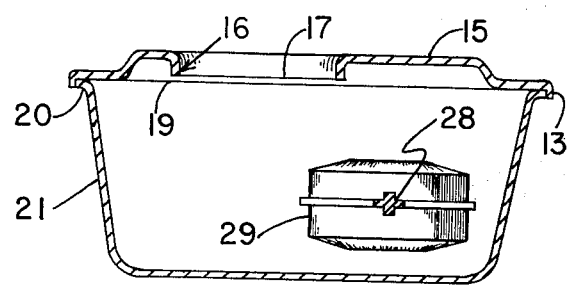

PET WATERING APPARATUS

BACKGROUND OF THE INVENTION

Domesticated animals, such as dogs and cats, are usually troublesome because the owners thereof do not always properly provide for the feeding and watering of the animals. Ownership of animals imposes a duty upon the owner to see that the pets are cared for and at least properly watered at all times. Considering the low cost of water, it is almost criminal for animals to be deprived of this basic component of their existence.

Sometimes pets become an extreme inconvenience and liability for the reason that they must be boarded or otherwise imposed upon a third party when their masters are absent from home for a length of time which exceeds one day. It is therefore desirable for one to be able to automatically and continuously water pets at all times in a reliable and punctual manner so as to avoid deprivation of this major component of their subsistence.

SUMMARY OF THE INVENTION

This invention relates to an automatic watering apparatus for pets comprising an upwardly opening enclosure member and a downwardly opening closure member, which are releasably affixed together to form a rugged water containing chamber. A float actuated valve means is affixed to a side wall of the enclosure member for maintaining a suitable liquid level therewithin.

An access port is formed in the top of the closure member which prevents spillage of liquid from the top of the container when an animal is drinking, and at the same time adds rigidity to the closure member structure. The float actuated valve and access port are misaligned relative to one another to prevent an animal from tampering with the float, thereby avoiding inadvertent overflow of the liquid from the container.

A primary object of this invention is the provision of a watering chamber for pets which provides a readily available supply of water at all times.

Another object of the invention is to provide improvements in pet watering apparatus.

A further object of this invention is to disclose and provide a container for watering pets which cannot inadvertently be overfilled.

A still further object of this invention is the provision of a rugged watering apparatus for pets which is low in cost, simple in construction, and which maintains a convenient supply of water available for pets so long as it is connected to a suitable source of water.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a top plan view of a watering apparatus for pets which has been fabricated in accordance with the present invention;

FIG. 2 is a side elevational view of the apparatus disclosed in FIG. 1, with parts thereof being broken away and the remaining parts being shown in cross-section;

FIG. 3 is a reduced top plan view showing the apparatus of FIG. 1 with a closure member thereof being removed so as to disclose the interior of the apparatus;

FIG. 4 is a reduced cross-sectional view taken along line 4—4 of FIG. 1, with additional parts being shown so as to better illustrate the invention; and FIG. 5 is an enlarged, fragmentary, cross-sectional representation of part of the invention seen in the previous figures.

DETAILED DESCRIPTION OF THE PREFERRED EMBODIMENT

In the figures the arrow at numeral 10 generally indicates a watering apparatus for pets. The apparatus includes a lid or closure member 11, and a container forming enclosure member 12. The closure member is releasably affixed to the enclosure member in the illustrated manner of FIGS. 2 and 4, as will be better appreciated later on in this disclosure.

Numeral 13 indicates a downwardly depending circumferentially extending edge portion which is joined to the marginal circumferentially extending edge portion 14 by the illustrated interconnecting outwardly curved wall portion.

The uppermost extremity of the closure member is made in the form of a flat horizontal surface 15, which is joined to the before-mentioned marginal flat surface 14 by the illustrated outwardly curved wall portion. Accordingly, flat surface 15 steps down to flat surface 14, which in turn is downwardly and outwardly curved into a vertically disposed edge portion 13.

Uppermost surface 15 has an access port 16 formed therein which is of a size to admit the muzzle or forward head portion of an animal therethrough. The side walls of the port are formed from rolling the surface 15 downwardly into a vertically disposed wall having a circumferentially extending lower terminal edge portion 17 which is disposed slightly above the lowermost horizontal edge portion 18 of the closure member.

The enclosure member 12 includes an uppermost horizontally disposed marginal edge portion 19 which is in the form of a flange, and which terminates in an outermost circumferentially extending edge portion 19' while the inwardly disposed portion of flange 19 is curved in a downward direction to form a sloped wall portion 21, a vertical wall portion 22, the illustrated side walls, and the bottom which supports the remainder of the structure.

Inlet 23 is adapted to be connected to any suitable source of water so as to enable a float actuated valve 24 to control the flow of water into chamber 25 when the valve is moved from the closed into the opened position.

Adjustment means 27 is interposed within actuator arm 28. The arm actuates the valve 24. The relative position of a float 29 with respect to the valve can be adjustably changed so as to attain the optimum fluid level within the chamber of the enclosure.

Adjustment 27 preferably includes a thumb screw which threadedly engages the bifurcated portion of arm 28, and which can be loosened to thereby enable the diametrically opposed arm portions to be pivoted about the thumb screw, thereby moving the float relative to the valve and container.

In operation, the vertical portion 13 of closure member 11 is forced into engagement with edge portion 19' of the flange 19, with the entire edge portion 19' bearing against the inside peripheral wall surface grooved at 13' (FIG. 5) of the skirt 13, thereby urging the skirt in an outward direction so as to releasably lock the lid to the container.

A convenient flexible conduit, such as a length of ¼" o.d. plastic hose is flow connected to inlet 23. The remainding end of the hose is flow connected to any suitable source of water, as for example, a standard pipe fitting which can be attached to a domestic water faucet in the usual manner.

Water flows from inlet 23 and through the float actuated valve 24 until a liquid level is attained within the container. The liquid level is next adjusted so that it fluctuates between a maximum and minimum level which is located anywhere desired, somewhere between flange 19 and the floor of the container.

Adjustment of the liquid level is attained by loosening screw 27 and pivoting float 29 thereabout. It will be noted that arm 28 cooperates with the valve lever by means of serrations or detents formed in the coacting ends of the adjacent members so as to provide high friction engagement between the two mating portions of the arm, thereby substantially reducing the force required by the thumb screw in order to keep the coacting parts in assembled relationship.

Flange 19 adds great rigidity to the enclosure member as well as presenting an edge portion which can be received within the skirt member to thereby lock the two members together so that they will not be inadvertently disengaged from one another by an animal or the like.

The enclosure member is in the form of a monocoque structure in that the downwardly depending skirt 13 together with the two circumferentially extending steps and the rolled access port adds to the structural rigidity of the assembly.

In addition to enhancing the structural integrity of the lid, the access port enables spillage of liquid on the closure member to drain back into the container.

It will be noted that the dashed line 30 indicates that the center of the port 16 is considerably off-set or misaligned relative to the float 29 so as to preclude manipulation or destruction of the float assembly by a curious animal.

The closure member can be forcibly removed from the container by grasping one of the curved ends of the skirt member and pulling in an upward direction away from the flange. The apparatus can be cleaned, adjusted, and returned to its assembled condition in a minimum time.

I claim:

1. A watering apparatus for pets comprising an upwardly opening enclosure member and a downwardly opening closure member, said enclosure having side walls, a bottom, and a circumferentially extending upper terminal edge portion; said closure means having side walls, a top, and a circumferentially extending lower terminal edge portion;

said lower terminal edge portion of the closure member and said upper terminal edge portion of said enclosure member having means thereon to enable each recited member to be releasably affixed together to form a water containing chamber;

said upper edge portion being separated from said side walls by a circumferentially extending horizontal flat marginal area;

said lower edge portion being in the form of a skirt member which is spaced apart from said top by a horizontal flat marginal area; a circumferentially extending groove formed on the inside wall of said skirt member;

said upper edge portion adapted to be received within said groove to thereby form the beforementioned means which enables the two members to be releasably locked together;

a float actuated valve means affixed to one of said walls and having an inlet and an outlet with said outlet being located within said chamber; said inlet adapted to be connected to a supply of water;

said float actuated valve means having a float disposed within said chamber, said float being affixed to said valve so as to actuate the valve to a flow permitting position when liquid within the chamber reaches a predetermined minimum level; and to actuate the valve to a flow preventing position when liquid within the chamber reaches a predetermined maximum level, and;

means forming a rolled wall portion in said closure means for forming an aperture through which a pet can gain access to water which may be contained within the chamber.

2. The apparatus of claim 1 wherein said aperture is located in said top of said closure member; said float actuated valve being located in a side wall of said enclosure member with the float being disposed towards one side of the chamber while the aperture is disposed towards an opposite side of the chamber so as to misalign the float and the aperture with respect to one another.

3. The apparatus of claim 1 wherein said float is attached to said valve by an arm; means in said arm for adjusting the height of the float relative to said valve.

4. The apparatus of claim 1 wherein said enclosure member and said closure member is plastic material made of high impact styrene.

* * * * *